US012561410B2

(12) United States Patent
Johnston et al.

(10) Patent No.: US 12,561,410 B2
(45) Date of Patent: Feb. 24, 2026

(54) SYSTEM AND METHOD TO PROVIDE DUMMY DATA FOR SOURCE ATTRIBUTION FOR PROPRIETARY DATA TRANSMISSION

(71) Applicants: ResMed Pty Ltd, Bella Vista (AU); ResMed Sensor Technologies Limited, Dublin (IE)

(72) Inventors: Benjamin Peter Johnston, Bella Vista (AU); Redmond Shouldice, Dublin (IE)

(73) Assignee: ResMed Sensor Technologies Limited, Dublin (IE)

( * ) Notice: Subject to any disclaimer, the term of this patent is extended or adjusted under 35 U.S.C. 154(b) by 265 days.

(21) Appl. No.: 18/018,692

(22) PCT Filed: Jul. 30, 2021

(86) PCT No.: PCT/IB2021/057003
§ 371 (c)(1),
(2) Date: Jan. 30, 2023

(87) PCT Pub. No.: WO2022/024084
PCT Pub. Date: Feb. 3, 2022

(65) Prior Publication Data
US 2024/0012887 A1 Jan. 11, 2024

Related U.S. Application Data

(60) Provisional application No. 63/059,808, filed on Jul. 31, 2020.

(51) Int. Cl.
*G06F 21/16* (2013.01)
*G06F 21/10* (2013.01)
(Continued)

(52) U.S. Cl.
CPC .......... *G06F 21/16* (2013.01); *G06F 21/6245* (2013.01); *G10L 19/018* (2013.01); *G06F 21/1063* (2023.08)

(58) Field of Classification Search
CPC .... G06F 21/10; G06F 21/106; G06F 21/1063; G06F 21/16; G06F 21/60; G06F 21/62;
(Continued)

(56) References Cited

U.S. PATENT DOCUMENTS 5,704,366 A * 1/1998 Tacklind .............. A61B 5/0002
128/904
7,224,819 B2 5/2007 Levy et al.
(Continued)

FOREIGN PATENT DOCUMENTS

WO 01/45410 A2 6/2001

OTHER PUBLICATIONS

International Search Report in International Patent Application No. PCT/IB2021/057003 mailed Oct. 15, 2021 (5 pp.).
(Continued)

*Primary Examiner* — D'Arcy Winston Straub
(74) *Attorney, Agent, or Firm* — NIXON PEABODY LLP

(57) ABSTRACT

A system and method for providing a unique signature for proprietary data. The proprietary data may be transmitted to multiple trusted parties. Each of the trusted parties will have proprietary data with a unique signature to that trusted party. The signature allows a user to determine the source of the proprietary data breach via the signature.

19 Claims, 8 Drawing Sheets

(51) Int. Cl.
    *G06F 21/62*        (2013.01)
    *G10L 19/018*     (2013.01)

(58) Field of Classification Search
    CPC . G06F 21/6218; G06F 21/6245; G10L 19/018
    See application file for complete search history.

(56)           References Cited

U.S. PATENT DOCUMENTS

| | | | |
|---|---|---|---|
| 9,299,364 B1* | 3/2016 | Pereira | G06F 3/165 |
| 2003/0103645 A1* | 6/2003 | Levy | H04N 1/32288 |
| | | | 707/E17.112 |
| 2003/0138127 A1 | 7/2003 | Miller et al. | |
| 2003/0149879 A1* | 8/2003 | Tian | H04N 1/32154 |
| | | | 713/176 |
| 2003/0190054 A1* | 10/2003 | Troyansky | H04N 21/23892 |
| | | | 707/E17.116 |
| 2005/0249374 A1* | 11/2005 | Levy | G11B 20/00884 |
| | | | 380/201 |
| 2007/0052560 A1* | 3/2007 | Van Der Veen | G10L 19/002 |
| | | | 341/51 |
| 2008/0037658 A1* | 2/2008 | Price | G10L 19/018 |
| | | | 704/E19.048 |
| 2013/0318114 A1* | 11/2013 | Emerson, III | G10L 19/018 |
| | | | 707/758 |
| 2018/0288117 A1* | 10/2018 | Mangalore | H04L 65/61 |
| 2019/0159960 A1* | 5/2019 | Nakata | A61B 5/4836 |
| 2019/0207949 A1* | 7/2019 | Parker | G06Q 20/3274 |
| 2019/0354658 A1 | 11/2019 | Young | |

OTHER PUBLICATIONS

Written Opinion in International Patent Application No. PCT/IB2021/057003 mailed Oct. 15, 2021 (6 pp.).

* cited by examiner

Fingerprint Signal

Fourier Transform of Fingerprint Signal

Base and Fingerprint Signal 512
510

Base + Fingerpint
Base Signal

Fingerprint - Base

530
Fourier Transforms pre & post fingerprint

Base + Fingerpint
Base

540

Butterworth filter frequency response

Fourier Transforms pre & post fingerprint

Fingerprint Signal

Fourier Transform of Fingerprint Signal

Base and Fingerprint Signal

Fingerprint - Base

Fourier Transforms pre & post fingerprint

FIG. 8A
Butterworth filter frequency response
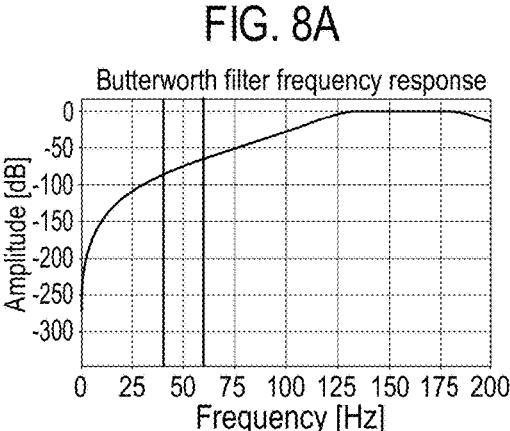
FIG. 8B
Butterworth filter frequency response
FIG. 8C
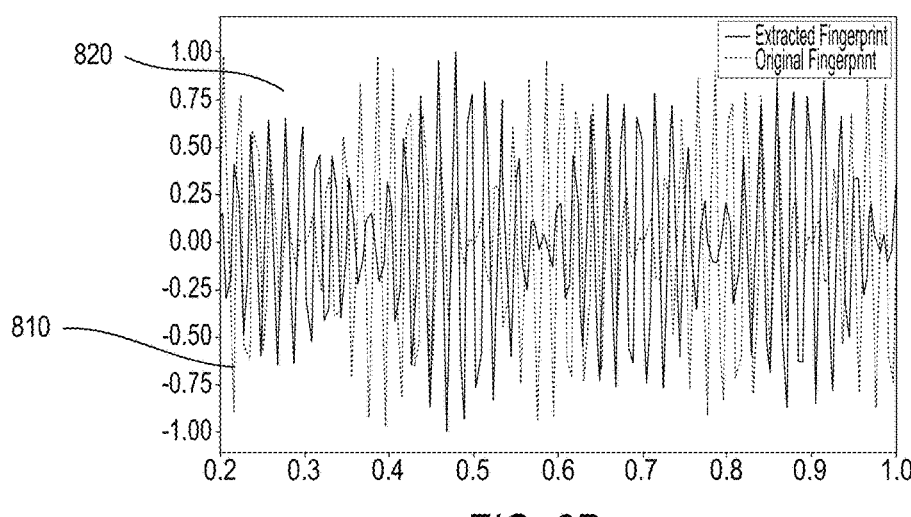
FIG. 8D
Fourier Transforms pre & post fingerprint
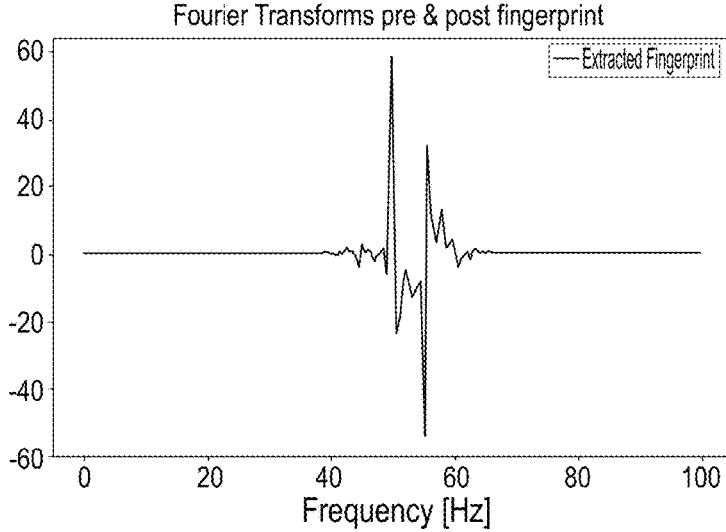

SYSTEM AND METHOD TO PROVIDE DUMMY DATA FOR SOURCE ATTRIBUTION FOR PROPRIETARY DATA TRANSMISSION

CROSS-REFERENCE TO RELATED APPLICATIONS

This application is a U.S. National Stage of International Application No. PCT/IB2021/041307, filed on Jul. 30, 2021, which claims benefit of, and priority to, U.S. Provisional Patent Application No. 63/059,808, filed Jul. 31, 2020, the contents of which are hereby incorporated by reference herein in their entireties.

TECHNICAL FIELD

The present disclosure relates generally to security for data, and more specifically to a system that provides an analog and/or digital fingerprint/robust identification for data sent to a third party to identify the source of any potential unauthorized disclosures of the data.

BACKGROUND

Data security is an issue of great importance in the information age. With the ubiquity of the Internet and resulting platforms, large amounts of confidential information is generated and stored. The importance of protecting such confidential information is growing. For example, in the medical field, privacy laws are designed to protect patient confidentiality. At the same time, personal data is recognized as necessary to provide greater services to data owners such as patients. For example, patients may find it beneficial to share confidential medical data with health care providers to provide better medical services to the patients. Another example is that consumers may wish to share confidential transactional data with another party, such as a retailer, to realize benefits provided from the party in exchange for the transactional data. Providing confidential data to another party risks unauthorized disclosure whether through the unauthorized disclosure by the party or through a security breach from the party. Currently, it is impossible to determine where confidential data was obtained when such an unauthorized disclosure or breach occurs. Thus, users are wary of sharing confidential data and therefore cannot fully utilize a range of services provided based on sharing the confidential data. A range of PII (personably identifiable data)/PHI (protected health information) may be provided with datasets shared with one or more internal divisions and/or one or more third parties, or the PII/PHI may be stripped prior to sharing. In both cases, it is desirable to be able to detect and identify a leakage of some or all of these data (even if stripped of PII/PHI), and identity to whom those data have been provided to.

The current paradigm for confidential data relies on the trust relationship between the data owner and other parties. In situations where the same data set is shared with multiple parties the degree of trust necessary is increased. In the event of a breach of trust or a data leak there is currently limited means of discovering the source of the leak. For example, if the confidential data was provided to multiple parties, systems level investigations would be required by each party to find security vulnerabilities. In the case of zero day exploits or as yet unknown vulnerabilities the source of the leak may be difficult to find or simply not found at all.

Currently, patients are wary of releasing personal data because such data may be either leaked or transferred without the authorization of the patient. In such a breach of confidence, the patient does not have any way to determine who caused the breach and take appropriate action to contain any further data breach. Essentially, once a user provides another party with a dataset, the user is relinquishing complete control of the data over to the second party by trusting that unauthorized copies are not shared or made.

Existing methods of tracking data breaches and leaks rely on the data itself being unique, trusting the party who leaked the data to announce the occurrence of a breach, or a forensic review of system records. Such existing methods are often foiled by having multiple recipients, and thus, multiple potential sources of the data breach.

There is a need for a method to embed confidential data with a fingerprint unique to the receiver of the data to identify the source of a data breach. There is a further need for a method to provide confidence in providing confidential data that the source of a breach may be identified from the leaked data.

SUMMARY

One disclosed example is a method of identifying a source of data. A request for proprietary data of a first party is received from a second party. A set of identification data unique to the second party is generated. The set of identification data is embedded into the proprietary data. The identification data is indistinguishable from the proprietary data. The proprietary data with the embedded identification data is sent to the second party.

A further implementation of the example method includes determining an unauthorized transfer of the proprietary data to a third party. The identification data is retrieved from the propriety data from the third party to determine the source of the proprietary data. Another implementation is where the method includes maintaining a library of sets of identification data. Each of the sets of identification data are unique to a party distinct from the first party. The set of identification data is stored in the library. Another implementation is where the proprietary data with the embedded identification data is sent to the second party via a transmission signal. Another implementation is where the transmission signal includes a timestamp and receiver ID. The set of identification data is a high frequency fingerprint signal where the period of the high frequency signal is proportional to the receiver ID and the phase the timestamp of transmission. Another implementation is where the proprietary data is organized in kernels. The identification data includes convolutional operators with the values of the kernel and size of the kernel specific to the identification data. Another implementation is where the identification data is periodic repeating patterns. Another implementation is where the identification data includes discrete data values. The identification data is embedded at known locations in the proprietary data. Another implementation is where the method includes encrypting the proprietary data with the embedded identification data prior to sending the proprietary data with the embedded identification data to the second party. Another implementation is where the method includes converting the proprietary data to a digital format after embedding the set of identification data. Another implementation is where the proprietary data is a physiological waveform measured from the first party. Another implementation is where the identification data is determined by the operation of a treatment device providing treatment to the first party and the embedding occurs on the treatment device. Another implementation is where the treatment device includes a sensor monitoring an operational function of the treatment device providing treatment to the first party. Another implementation is where the treatment device is a respiratory therapy device and sensor is one of a microphone sensing motor noise or a pressure sensor sensing air flow. Another implementation is where the proprietary data is breath related data from breathing sensed from the first party.

Another disclosed example is a system to embed identification data to track proprietary data supplied by a first party. The system includes a storage device storing proprietary data belonging to the first party. A fingerprint engine generates identification data unique to the second party. A combination engine is operable to embed the identification data to the proprietary data. The identification data is indistinguishable from the proprietary data. A data transmitter sends the combined proprietary and identification data to a second party.

A further implementation of the example system includes an identification determination module retrieving the identification data from the propriety data from the third party to determine the source of the proprietary data when an unauthorized transfer of the proprietary data to a third party occurs. Another implementation is where the system includes a library of sets of identification data. Each of the sets of identification data are unique to a party distinct from the first party. The set of identification data is stored in the library. Another implementation is where the proprietary data with the embedded identification data is sent to the second party via a transmission signal. Another implementation is where the transmission signal includes a timestamp and receiver ID. The set of identification data is a high frequency fingerprint signal where the period of the high frequency signal is proportional to the receiver ID and the phase the timestamp of transmission. Another implementation is where the proprietary data is organized in kernels. The identification data includes convolutional operators with the values of the kernel and size of the kernel specific to the identification data. Another implementation is where the identification data is periodic repeating patterns. Another implementation is where the identification data includes discrete data values. The identification data is embedded at known locations in the proprietary data. Another implementation is where the combination engine encrypts the proprietary data with the embedded identification data prior to the data transmitter sending the proprietary data with the embedded identification data to the second party. Another implementation is where the example system includes an analog to digital converter operable to convert the proprietary data to a digital format after embedding the set of identification data. Another implementation is where the proprietary data is a physiological waveform measured from the first party. Another implementation is where the example system includes a treatment device that determines the identification data is determined by the operation of the treatment device providing treatment to the first party. The fingerprint engine is on the treatment device. Another implementation is where the treatment device includes a sensor monitoring an operational function of the treatment device providing treatment to the first party. Another implementation is where the treatment device is a respiratory therapy device and sensor is one of a microphone sensing motor noise or a pressure sensor sensing air flow. Another implementation is where the proprietary data is breath related data from breathing sensed from the first party.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 8A is a Butterworth response of an original multi-band fingerprint signal;

FIG. 8B is a Butterworth response of a leaked base signal;

FIG. 8C is the extracted multi-band fingerprints from the original signal and the leaked signal;

FIG. 8D is the result of a Fourier transformation of the extracted fingerprint signal in FIG. 8C.

Figure 1:
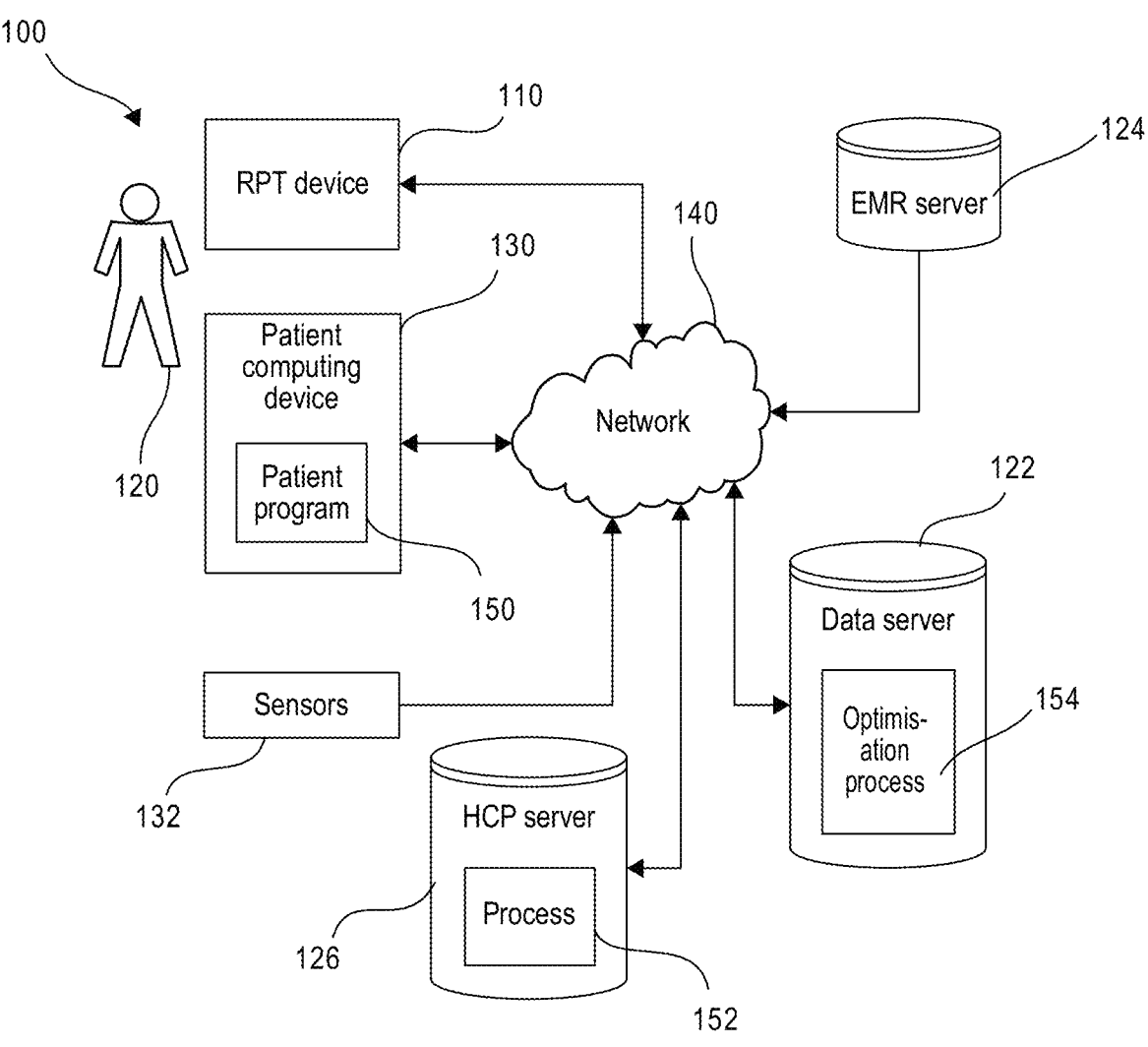
FIG. 1 is a block diagram of an example medical system that gathers confidential information from a patient.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a system and method for providing a quick robust determination of the source of an unauthorized disclosure of confidential data by providing an approach to provide and authenticate a mixed signal (analog, digital, or both) fingerprint with data that is unique to the receiving party of the confidential data. The approach can operate and be robust to resampling—i.e., it is a multi-rate system, and in addition is a multimodal approach that can operate on sensor data, processed data, and structured and unstructured data such as name, email address, tax/medical identifiers, as well as questionnaire data, and other health and behavioral data such as shared via an API with a third party. When combined with other technologies such as encryption or digital rights management, the disclosed system can improve data security. By providing a fingerprint to data sent to outside parties, that is unique for the party receiving the data, the source of a breach can be quickly found by extracting the fingerprint from the leaked confidential data and matching the fingerprint with existing records.

One application of the below described system and method is the use of unique dummy data that is sent along with confidential patient data to a data requestor. The data requestor may use the confidential patient data to provide additional services to the patient. The dummy data is merged with the patient data and is unique to the data requestor. In this manner, should the data requestor make an unauthorized disclosure of the patient data to a third party, the dummy data may be identified and thus it may be determined that the data requestor is the source of the unauthorized disclosure. This will provide deterrence against unauthorized transfer of patient data from an initial requestor. This system and method will facilitate the willingness of patients to allow access to their data as they can be assured it will be limited to the requestor. Further, the concept is applicable to any type of personal data that could be sent to another party.

FIG. 1 is a block diagram of an example data collection environment for obtaining data from patients. In this example, a self-optimizing respiratory therapy (SORT) system 100 is shown. The SORT system 100 comprises a respiratory therapy (RPT) device 110 configured to provide respiratory therapy to a patient 120, a data server 122, a health or home care provider (HCP) server 124, an electronic medical records (EMR) server 126, a patient computing device 130, and one or more physiological sensors 132. The patient computing device 130 and physiological sensors 132 are co-located with the patient 120 and the RPT device 110 in this example. In the implementation 100 shown in FIG. 1A, these entities are all connected to, and configured to communicate with each other over, a wide area network 140, such as the Internet. The connections to the wide area network 140 may be wired or wireless. The EMR server 124, the HCP server 126, and the data server 122 may all be implemented on distinct computing devices at separate locations, or any sub-combination of two or more of those entities may be co-implemented on the same computing device.

The patient computing device 130 may be a personal computer, mobile phone, tablet computer, or other device. The patient computing device 130 is configured to intermediate between the patient 120 and the remotely located entities of the SORT system 100 over the wide area network 140. In the implementation of FIG. 1, this intermediation is accomplished by a software application program 150 that runs on the patient computing device 130. The patient program 150 may be a dedicated application referred to as a "patient app" or a web browser that interacts with a website provided by the health or home care provider. Alternatively, the sensors 128 and the RPT device 110 communicate with the patient computing device 130 via a local wired or wireless network (not shown) based on a protocol such as Bluetooth. The SORT system 100 may contain other RPT devices (not shown) associated with respective patients who also have respective associated computing devices and associated HCP servers (possibly shared with other patients). All the patients in the SORT system 100 may be managed by the data server 122.

The sensors 132 may include a pressure sensor, a flow rate sensor, temperature sensor, a motion sensor, a microphone, a speaker, a radio-frequency (RF) receiver, a RF transmitter, a camera, an infrared sensor, a photoplethysmogram (PPG) sensor, an electrocardiogram (ECG) sensor, an electroencephalography (EEG) sensor, a capacitive sensor, a force sensor, a strain gauge sensor, an electromyography (EMG) sensor, an oxygen sensor, an analyte sensor, a moisture sensor, a LiDAR sensor, or any combination thereof. Generally, each of the one or more sensors 132 are configured to output sensor data that is received and stored in the memory device or one or more other memory devices on the RPT device 110 or the computing device 130.

The sensors 132 may each be configured to provide physiological data (biomotion, physical activity, temperature, weight, and oxygen saturation respectively) of the patient 120. The RPT device 110 is configured to store therapy data from each therapy. In this example, therapy data for a session may include device settings and therapy variable data representing one or more variables of the respiratory therapy throughout the therapy session. The RPT device 110 is configured to transmit the therapy data to the data server 122. The data server 122 may receive the therapy data from the RPT device 110 according to a "pull" model whereby the RPT device 110 transmits the therapy data in response to a query from the data server 122. Alternatively, the data server 122 may receive the therapy data according to a "push" model whereby the RPT device 110 transmits the therapy data to the data server 122 as soon as it is available after a therapy session.

Therapy data received from the RPT device 110 is stored and indexed by the data server 122 so as to be uniquely associated with the RPT device 110 and therefore distinguishable from therapy data from any other RPT device(s) in the SORT system 100. In this regard, although only one RPT device is illustrated in FIG. 1 for ease of explanation, the system 100 may contain multiple RPT devices. The data server 122 may be configured to calculate summary data for each session from the therapy data received from the RPT device 110. Summary data variables for a session comprise summary statistics derived by conventional scoring means from the therapy variable data that forms part of the therapy data. Alternatively, the RPT device 110 may from the therapy data stored at the end of each session. The therapy data may also be stored in a removable memory, such as a USB drive or a SD card that may be inserted into a reader in communication with the data server 122. Alternatively, the RPT device 110 may be is configured to transmit the therapy data to the patient computing device 130 via a wireless protocol, which receives the data as part of the patient program 150. The patient computing device 130 then transmits the therapy data to the data server 122 according to pull or push model.

The data server 122 may also be configured to receive data from the patient computing device 130 including data entered by the patient 120, behavioral data about the patient, or therapy/summary data. The data server 122 may also be configured to receive physiological data from the one or more physiological sensors 132.

One example of such post-processing is to determine whether the most recent session is a "compliant session." Some compliance rules specify the required RPT device usage over a compliance period, such as 30 days, in terms of a minimum duration of device usage per session, such as four hours, for some minimum number of days, e.g. 21, within the compliance period. A session is deemed compliant if its duration exceeds the minimum duration. The summary data post-processing may determine whether the most recent session is a compliant session by comparing the usage time with the minimum duration from the compliance rule. The results of such post-processing are referred to as "compliance data". One example of multi-session compliance data is a count of compliant sessions since the start of therapy.

The EMR server 124 contains electronic medical records (EMRs), both specific to the patient 120 and generic to a larger population of patients with similar respiratory disorders to the patient 120. An EMR, sometimes referred to as an electronic health record (EHR), typically contains a medical history of a patient including previous conditions, treatments, co-morbidities, and current status. The EMR server 124 may be located, for example, at a hospital where the patient 120 has previously received treatment. The EMR server 124 is configured to transmit EMR data to the data server 122, possibly in response to a query received from the data server 122.

In this example, the HCP server 126 is associated with the health/home care provider (which may be an individual health care professional or an organization) that is responsible for the patient's respiratory therapy. An HCP may also be referred to as a DME or HME (domestic/home medical equipment provider). The HCP server 126 hosts a process 152 that is described in more detail below. One function of the HCP server process 152 is to transmit data relating to the patient 120 to the data server 122, possibly in response to a query received from the data server 122.

In some implementations, the data server 122 is configured to communicate with the HCP server 126 to trigger notifications or action recommendations to an agent of the HCP such as a nurse, or to support reporting of various kinds. Details of actions carried out are stored by the data server 122 as part of the engagement data. The HCP server 126 hosts an HCP server process 152 that communicates with the optimization process 154 and the patient program 150.

As may be appreciated data in the data server 122, EMR server 124 and HCP server 126 is generally confidential data in relation to the patient 120. Typically, the patient 120 must provide permission to send the confidential data to another party. Such permissions may be required to transfer data between the servers 122, 124 and 126 if such servers are operated by different entities.

Figure 2:
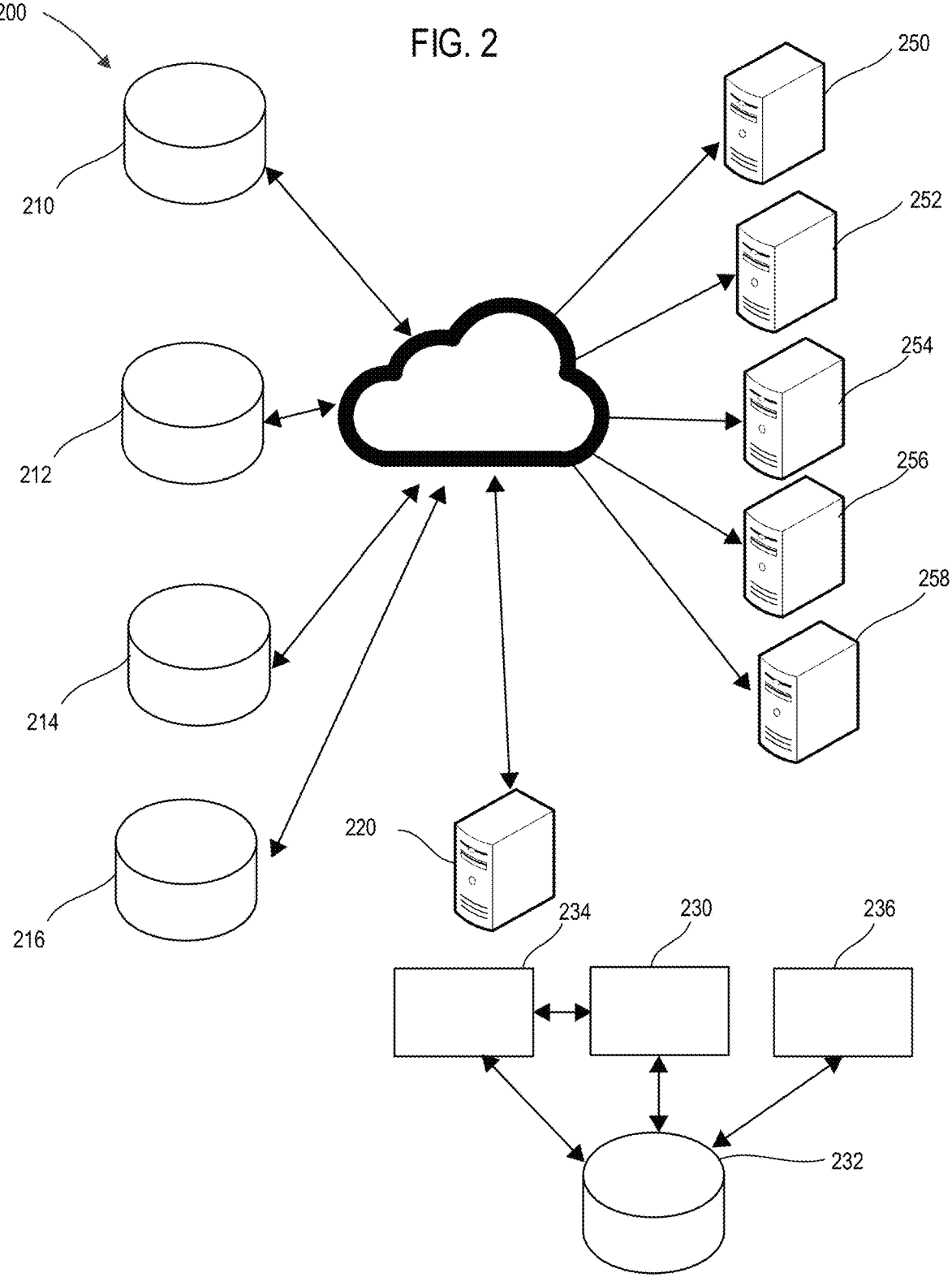
FIG. 2 is a block diagram of a data identification system that allows unique identification of confidential information sent to other parties.

FIG. 2 shows a system 200 that allows a user such as a patient to authorize the transmission of their confidential medical data from a medical data server 210 such as the data server 122, EMR server 124 and HCP server 126 in FIG. 1. Although this example relates to medical data, any type of confidential data belonging to a person may incorporate the concepts herein. Such data may include consumer data stored in a consumer data server 212, social media data stored in a social media server 214, or identification information stored in a governmental records data server 216. Of course, other types of confidential data may be protected. Any of the servers such as the servers 212, 214, and 216 that store confidential data constitute storage devices that store proprietary data belonging to the patient.

The system 200 includes a data protection server 220 that may be operated by a separate party such as a data broker. As will be explained the data protection server 220 includes a fingerprint engine 230) and an identification information database 232 that provides a unique fingerprint for each instance of confidential data authorized by the user to be sent to another party. The identification information database 232 is a library of sets of identification data. Each of the sets of identification data are unique to a party distinct from the patient. Thus, identification data in the form of the fingerprint is correlated with each party that the confidential data of the patient is transmitted to. The identification data is maintained to determine the source of unauthorized disclosure of the proprietary data to a third party.

The data protection server 220 may be operated or part of any of the data servers 210, 212, 214 or 216. In this example, the data protection server 220 is connected to the data servers 210, 212, 214 and 216 via a network 240 such as the Internet. The user may give permission to different parties 250, 252, 254, 256, and 258 to receive access to confidential data in one or more of the data servers 210, 212, 214 or 216. Such confidential data is provided a data fingerprint generated by the fingerprint engine 230. The generated fingerprint is unique to the recipient of the confidential data. In this manner, should there be a breach, the source of the breach may be readily identified. For example, if the same confidential data is sent to all of the parties 250, 252, 254, 256, and 258, leaked confidential information may be examined, and the fingerprint of the leaked information identifies the source of the breach may be identified as one of the parties 250, 252, 254, 256, and 258.

The system in FIG. 2 is used to ensure the safety of the transferring of confidential data and provide more efficient disposition of security breaches. For example, such confidential data may be valuable for a patient to send to another party for a variety of reasons such as the need for analysis by a health care provider, or in exchange for enhanced health care services. The system thus provides confidence that the source of a breach may be identified quickly and remedied. Such a system also deters unscrupulous parties from impermissibly brokering the data to another party.

The fingerprint engine 230 in the data protection server 220 in FIG. 2 provides identification data in the form of a unique fingerprint or signature to the data every time the user authorizes the sharing of the data with another party. The unique fingerprint is then stored with relevant identification data of the party by the data protection server 220 for later use in the event of a breach of the confidentiality. A combination engine 234 embeds the identification data to the proprietary data. The identification data is indistinguishable from the proprietary data. After proper authorization, a data transmitter sends the combined proprietary and identification data to a second party such as the parties 250, 252, 254, 256, and 258.

The unique fingerprint is generated and incorporated into the data set in such a way that the data is not invalidated, but that the fingerprint can still be recovered from the data set. Ideally the fingerprint cannot be removed from the data without invalidating the integrity of the data itself. The fingerprint to be applied may vary in nature or value depending on the type of data being transmitted, the party receiving the data, the data in which the data is being transmitted or a combination of these factors or any other aspect of the data transmission that is to be traced. In the event of a breach or leak the source can be determined by extracting the unique fingerprint from the data and matching with that of the offender, allowing the data provider to specifically revoke access or take other control measures. When an unauthorized transfer of the proprietary data occurs to a third party, the data protection server 220 runs an identification determination module 236 that retrieves the identification data from the proprietary data from the third party and matches the identification data stored in the library of identification data in the database 232 associated with parties to which the proprietary data was transmitted to determine the source of the proprietary data.

One example of the application of the system 200 is use of unique fingerprint data that is sent along with patient data to a data requestor who may use the patient data. The fingerprint data is merged with the patient data and is unique to the data requestor. In this manner, should the data requestor make an unauthorized disclosure of the patient data to a third party, the fingerprint data may be identified and thus it may be determined that the data requestor is the source of the unauthorized disclosure. This will provide deterrence against unauthorized transfer of patient data from an initial requestor. This method will facilitate the willingness of patients to allow access to their data as they can be assured it will be limited to the requestor. The concept is applicable to any type of personal data that could be sent to another party.

In one example, a single or mixed band frequency fingerprint may be combined with a base signal of the confidential data. A unique fingerprint is created for each data receiver (consumer). The fingerprint is generated by modifying a function or functions (e.g., sin, cos, tan, cosh . . . ), frequency, amplitude and phase used to generate the unique fingerprint. The generated fingerprint is added to the datastream as it passes through a security engine. The fingerprint may be added through either simple addition in the case of simple data or convolutional operation in the case of images or time series. If the confidential data is leaked, the fingerprint signal may be extracted by using an IIR or FIR filter to extract the signal from the leaked data. In the case of a convolutional operation, a deconvolution step would be performed to check against the original data. A pattern match with the stored fingerprint signals is performed to identify the source of the leaked data.

Figure 3:
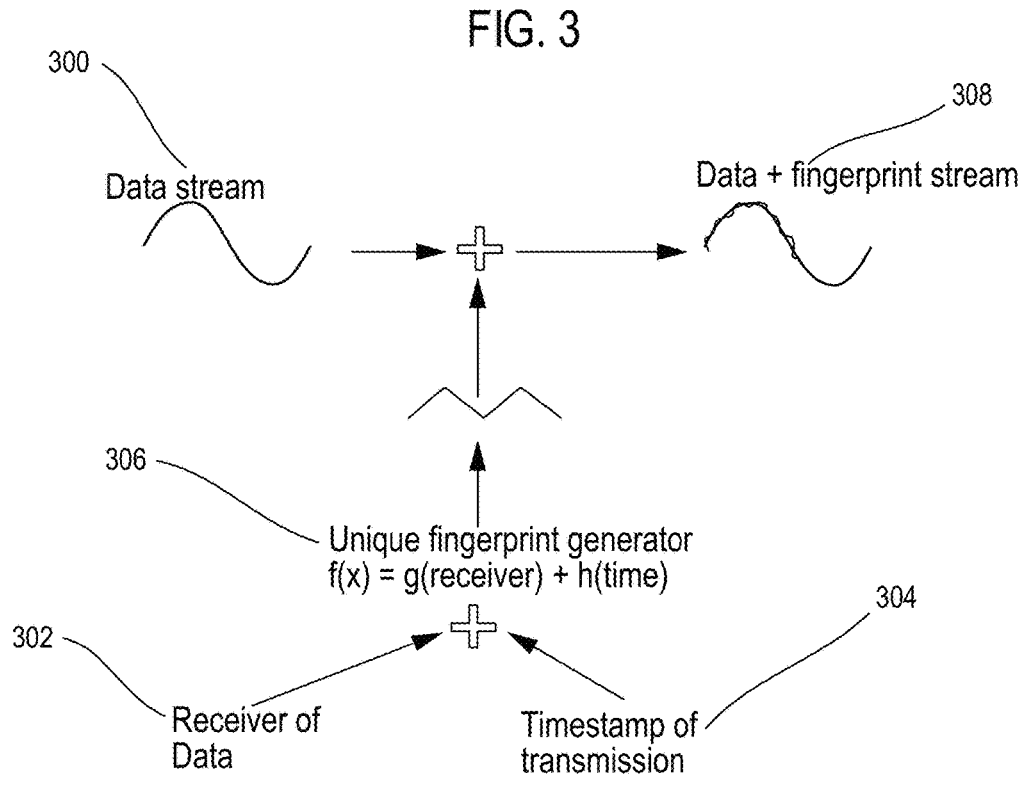
FIG. 3 is a flow diagram of the process of generating a unique fingerprint associated with a receiving party of confidential data.

FIG. 3 is a flow diagram of generating a fingerprint. Initially a data stream of the confidential information is provided (300). A receiver of the data is identified (302). The timestamp of the transmission of the data is also obtained (304). The data for the receiver and the timestamp of the transmission is combined by a fingerprint generator using a function of the timestamp and a function relating to the identity data of the receiver (306). The fingerprint signal is then combined with the data stream to create a combined data stream and fingerprint signal (308).

The feature of the example method in FIG. 3 is the fingerprint generator executed by the fingerprint engine 230 in FIG. 2. The fingerprint generator is required to create a unique pattern to be applied to the data given the information that is to be tracked. In this example, the information to be tracked includes the identifier of the party receiving the information and a timestamp of the transmission. However rather than simply generating a unique pattern, the pattern must be small enough as to not radically alter the data itself, but must also be able to be removed from the data such that it can be identified.

A simple example may be a high frequency fingerprint signal that is applied to a low frequency data stream. In such an example, the period of the signal is proportional to the receiver identification data and the phase of the timestamp of transmission. The fingerprint signal is small enough not to impact the data quality and has also been designed to avoid the information areas of the signal. Other examples could include convolutional operators with the values of the kernel and size of the kernel being specific to the information to be tracker. These would be particularly useful as fingerprints for image based data streams. Once the fingerprint has been applied to the signal it is then ready for transmission. Other additional controls such as encryption with specific end user keys may be applied to the combined data stream and finger print signal.

Examples of fingerprint signals include low frequency signals, high frequency signals, mixed-band (i.e. multiple frequency) signals, convolutional operators, periodic repeating patterns, insertion of small, discrete data values at known locations, upsampling the signals at specific rates, and different one-way hash functions. As explained above, such fingerprint signals are unique to the data receiver and are combined with the confidential data stream.

Figure 4A:
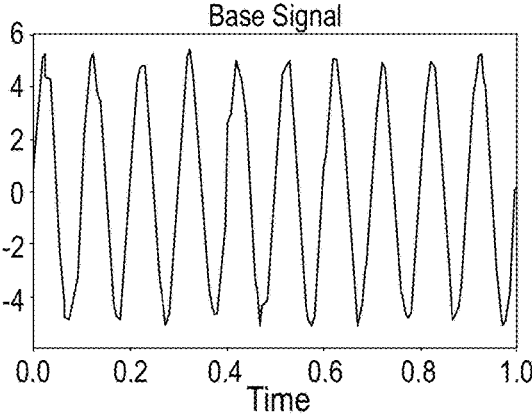
FIG. 4A is a signal trace of an example base signal of confidential data.
Figure 4B:
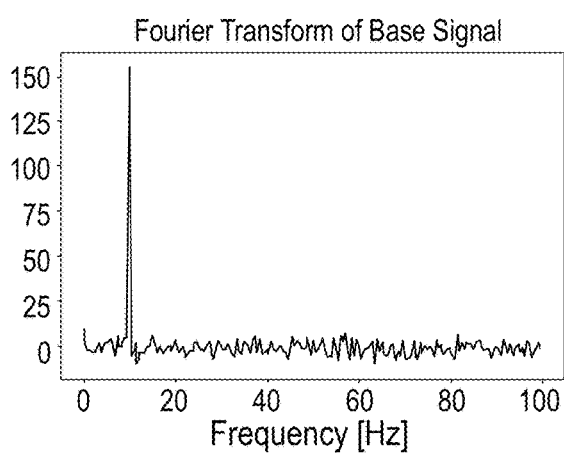
FIG. 4B is a signal trace of the base signal in FIG. 4A after application of a Fourier transformation function.

FIGS. 4A-4B show different signal diagrams for application of one example of a fingerprint that may be applied to confidential data. First, the confidential data is obtained through the below example code.

```
import numpy as np
import matplotlib.pyplot as plt
import scipy.signal as signal
```

A base signal is then generated from the confidential data through the following example code.

```
sig_freq = 10 # 100Hz
p = 2 # window 10
sample_freq = 200
N = sample_freq * p # Number of samples
A = 5 # Amplitude
```

-continued

```
t = np.linspace(0, p, N)
base_sig = A * np.sin(2 * np.pi * sig_freq * t)
# Add some noise for realism
A_noise = A * 0.01 # 2% noise
noise = np.random.randn(len(t)) * A * A_noise
base_sig += noise
plt.plot(t, base_sig);
plt.title(f'Base Signal');
plt.xlabel('Time');
plt.xlim([0, 1]);
```

FIG. 4A shows a signal trace of the example generated base signal from executing the above code.

In this example, a Fourier transformation function is applied to the base signal as shown by the following code.

```
freq = np.fft.fftfreq(t.shape[-1])[:(N//2)] * sample_freq
power = np.fft.fft(base_sig).real[:(N//2)]
plt.plot(freq, power);
plt.title('Fourier Transform of Base Signal');
plt.xlabel('Frequency (Hz)');
```

FIG. 4B shows the result of the Fourier transformation function on the base signal.

The characteristics of such a signal could be modified on a data consumer basis, including the frequencies, phase, type of signal etc. In this example, the fingerprint signal has a single band frequency. The specific example shown below has a single frequency band of 40 Hz (freq_finder 1). The commented out code is used to add a second frequency band to the signature. This results in a single band fingerprint that is embedded in the base signal in FIGS. 4A-4B. A simple example of the generation of the single band fingerprint is shown in the following code:

```
freq_finger1 = 40 # 40Hz fingerprint frequency 1
#freq_finger2 = 80 # 60Hz fingerprint frequency 2
amplitude_finger = A * 0.15
finger_print = amplitude_finger * np.sin(2 * np.pi *
freq_finger1 * t) # + np.sin(2 *
np.pi * freq_finger2 * t)
#finger_print *= amplitude_finger
plt.plot(t, finger_print);
plt.title('Fingerprint Signal');
plt.xlabel('Time (s)');
plt.xlim([0, 1]);
```

Figures 5A, 5B, 5C, 5D, 5E:
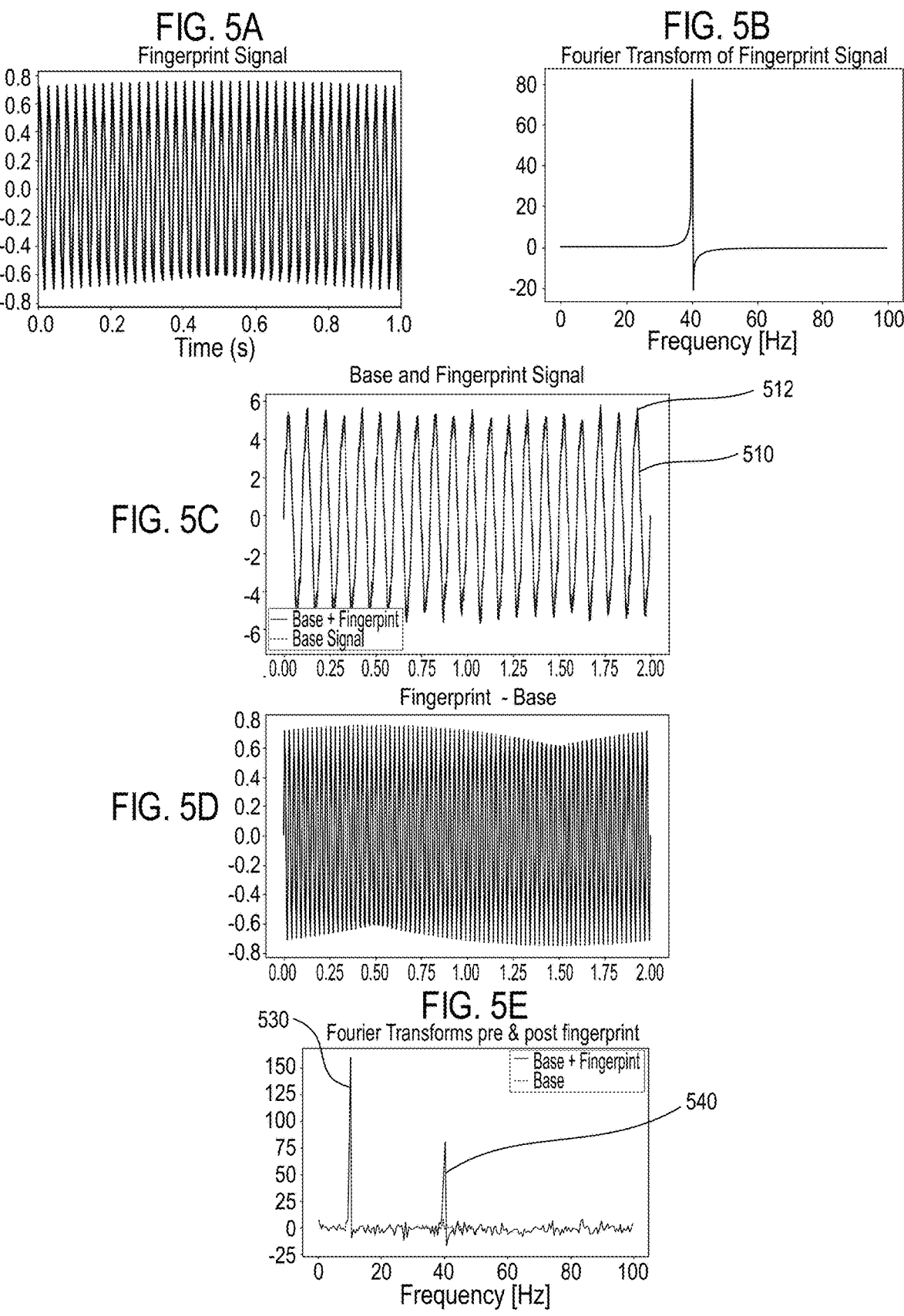
FIG. 5A is an example single band fingerprint signal.
FIG. 5B is the example single band fingerprint signal in FIG. 5A after application of a Fourier transformation function.
FIG. 5C is an interposition of the base signal in FIG. 4A and the single band fingerprint signal in FIG. 5A.
FIG. 5D is the combined base signal and fingerprint signal.
FIG. 5E is the result of a Fourier transformation of the combined base signal and fingerprint signal that may be sent to a receiver.

FIG. 5A shows a trace of the resulting single band fingerprint signal. A Fourier transformation is then applied to the fingerprint signal in FIG. 5A according to the following code.

```
power_finger = np.fft.fft(finger_print).real[:(N//2)]
plt.plot(freq, power_finger);
plt.title('Fourier Transform of Fingerprint Signal');
plt.xlabel('Frequency (Hz)')
```

FIG. 5B shows the resulting signal from the Fourier transformation.

The fingerprint signal is then added to the base signal. An example code segment for adding the fingerprint signal in FIG. 5A to the base signal in FIG. 4A is as follows:

```
base_fingerprint = base_sig + finger_print
# Both Signals
plt.figure(figsize=(10, 21))
```

-continued

```
plt.subplot(3, 1, 1)
plt.title('Base and Fingerprint Signal')
plt.plot(t, base_fingerprint, label='Base + Fingerprint');
plt.plot(t, base_sig, label='Base Signal');
plt.legend( );
# Difference
plt.subplot(3, 1, 2)
plt.title('Fingerprint – Base')
plt.plot(t, base_fingerprint – base_sig);
# FFT of combined signal
power_finger = np.fft.fft (base_fingerprint).real[:(N//2)]
plt.subplot(3, 1, 3)
plt.plot(freq, power_finger, label='Base + Fingerprint');
plt.plot(freq, power, label='Base');
plt.title('Fourier Transforms pre & post fingerprint');
plt.xlabel('Frequency (Hz)');
plt.legend( );
```

FIG. 5C shows the interposition of the base signal and the single band fingerprint signal based on the execution of the above code. One trace 510 shows the base signal and a second trace 512 shows the fingerprint signal combined with the base signal. FIG. 5D shows the combined base signal and fingerprint signal. FIG. 5E shows the resulting output of the Fourier transformation of the base and fingerprint signal. A first trace 530 shows the base signal and a second trace 540 shows the base signal and the fingerprint signal.

If the confidential data is leaked, the fingerprint signal may be extracted by examining the confidential data base signal. First, a filter determines a Butterworth response of the original data. The filter is required to extract the fingerprint and check the data or fingerprint against the original(s) to identify the culprit. An alternative step as opposed to separating the fingerprint from the leaked data would be just to compare the leaked data to a range of stored samples and check for equality/similarity. An example code segment to perform the filter function is shown as follows:

```
# Design the filter
#range_of_filter = (freq_finger2 – freq_finger1)
range_of_filter = 10
band_centre = freq_finger1#np.mean([freq_finger1,
freq_finger2])
bands = [band_centre – range_of_filter, band_centre +
range_of_filter]
filter_bands = [i / (0.5 * sample_freq) for i in bands]
order = 10
sos = signal.butter (order, filter_bands, btype='bandpass',
analog=False,
output='sos')
w, h = signal.sosfreqz (sos, worN=2000)
w = w * 0.5 * sample_freq
plt.plot(w, 20 * np.log10(abs(h)))
#plt.xscale('log')
plt.title('Butterworth filter frequency response')
plt.xlabel('Frequency [Hz]')
plt.ylabel('Amplitude [dB]')
#plt.margins (0, 0.1)
plt.xlim([0, 200])
plt.grid(which='both', axis='both')
plt.axvline(bands[0], color='green') # cutoff frequency
plt.axvline(bands[1], color='green') # cutoff frequency
plt.show( )
```

Figure 6A:
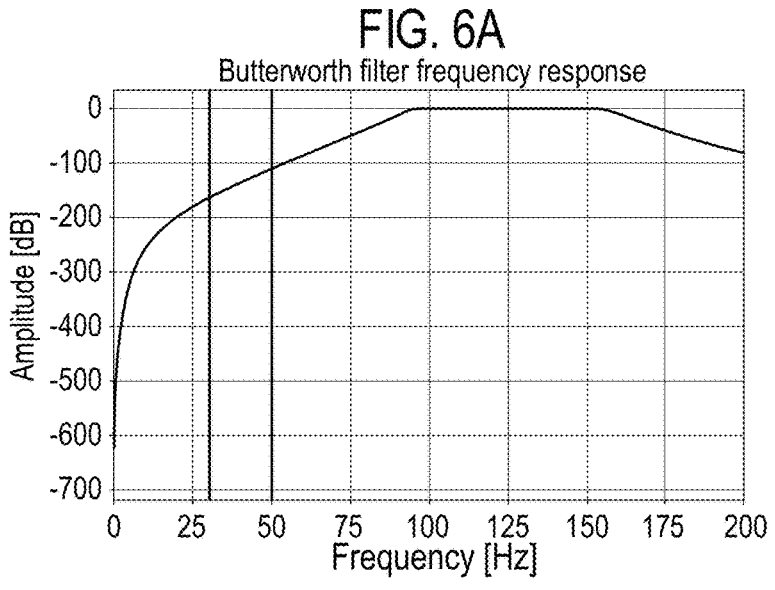
FIG. 6A is a Butterworth response from a combine base signal and fingerprint signal.

FIG. 6A shows the resulting Butterworth frequency response from the combined base signal and fingerprint signal. Of course other types of filters may be used such as a FIR or various power. A similar routine is applied to the leaked data, which is in the form of a combined base signal and fingerprint signal.

The resulting responses are then compared by applying a Fourier transformation to both signals. An example of the comparison is shown in following code:

```
# Both Signals
plt.figure(figsize=(10, 14))
# Apply the filter to the 1st second of the signal
y = signal.sosfilt (sos, base_fingerprint)
delay = ((order – 1)) / (2 *sample_freq)
plt.subplot(2, 1, 1)
plt.plot(t + delay, y / y.max( ), label='Extracted
Fingerprint')
plt.plot(t, finger_print / finger_print.max( ),
label='Original Fingerprint')
plt.xlim([0, 0.5])
plt.legend(loc='upper right')
# FFT of combined signal
power_y = np.fft.fft(y).real[:(N//2)]
plt.subplot(2, 1, 2)
plt.plot(freq, power_finger, label='Base + Fingerprint');
plt.plot(freq, power_y, label='Extracted Fingerprint');
plt.title('Fourier Transforms pre & post fingerprint');
plt.xlabel('Frequency (Hz)');
plt.legend( );
```

Figure 6B:
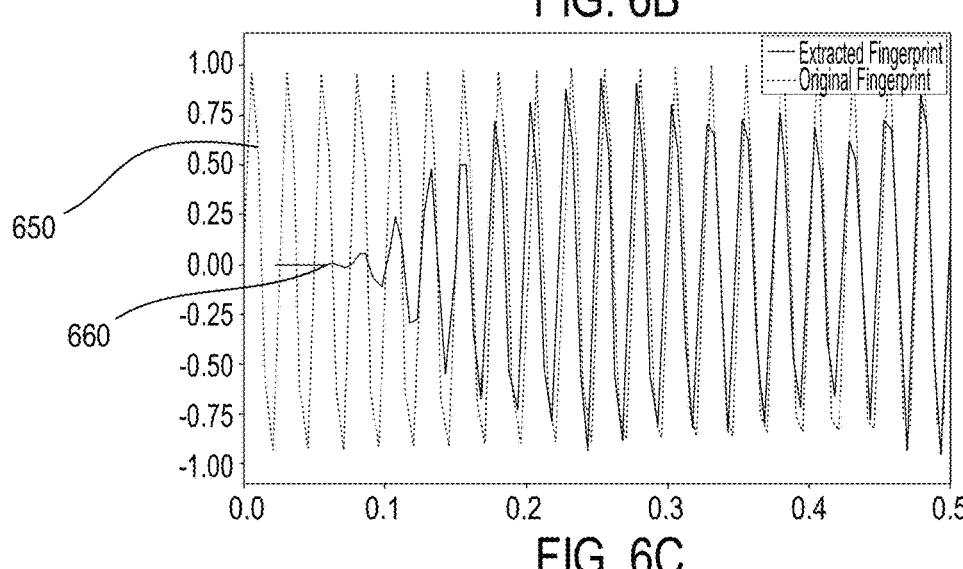
FIG. 6B shows the signals of the fingerprints extracted from the original signal and the leaked signal.
Figure 6C:
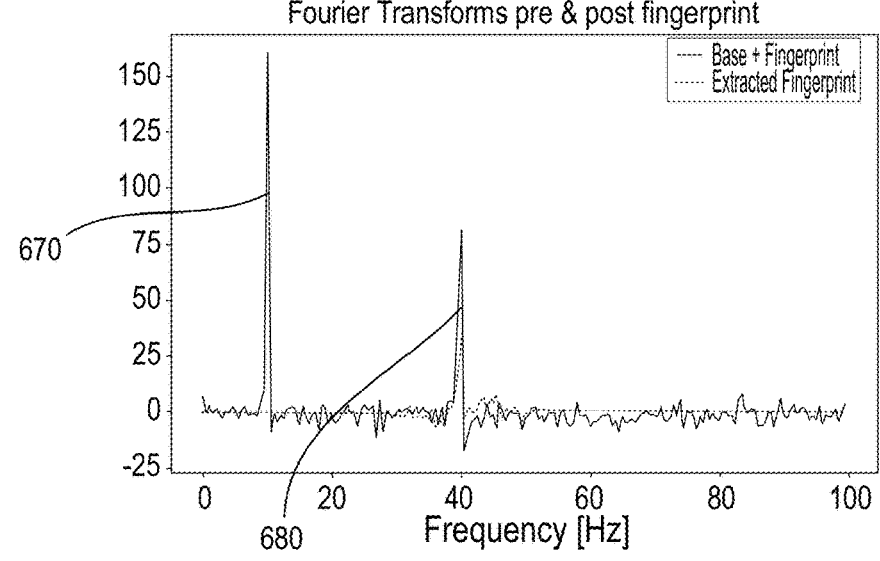
FIG. 6C shows the Fourier transformation of the extracted fingerprint signals.

FIG. 6B shows the signals of the extracted fingerprints from the original signal and the leaked signal. One trace 650 shows the original fingerprint and another trace 660 shows the extracted fingerprint. FIG. 6C shows the Fourier transformation of the extracted fingerprint signals. One trace 670 shows the transformation of the original base and fingerprint signal and another trace 680 shows the transformation of the extracted fingerprint. The extracted fingerprint signal can then be compared with the original fingerprint and if there is a match the source of the leak of the data is identified.

Alternatively, a multi-band fingerprint may be generated for the data generated in above example shown in FIGS. 4A-4B. The characteristics of such a signal could be modified on a data consumer basis, including the frequencies, phase, type of signal etc. An additional amplitude is added for a second frequency of the fingerprint signal. The second amplitude is in the frequency domain because a second fingerprint signal is added. The Fourier transformation results in a waveform with the amplitudes of both fingerprints. A simple example of generating a multi-band fingerprint is shown in the following code:

```
freq_finger1 = 50 # 50Hz fingerprint frequency 1
freq_finger2 = 55 # 55Hz fingerprint frequency 2
amplitude_finger = A * 0.2
finger_print = amplitude_finger * 0.5 * np.sin(2 * np.pi *
freq_finger1 * t)
finger_print += amplitude_finger * 0.5 * np.sin(2 * np.pi *
freq_finger2 * t)
plt.plot(t, finger print);
plt.title('Fingerprint Signal');
plt.xlabel('Time (s)');
plt.xlim([0, 1]);
```

Figures 7A, 7B, 7C, 7D, 7E:
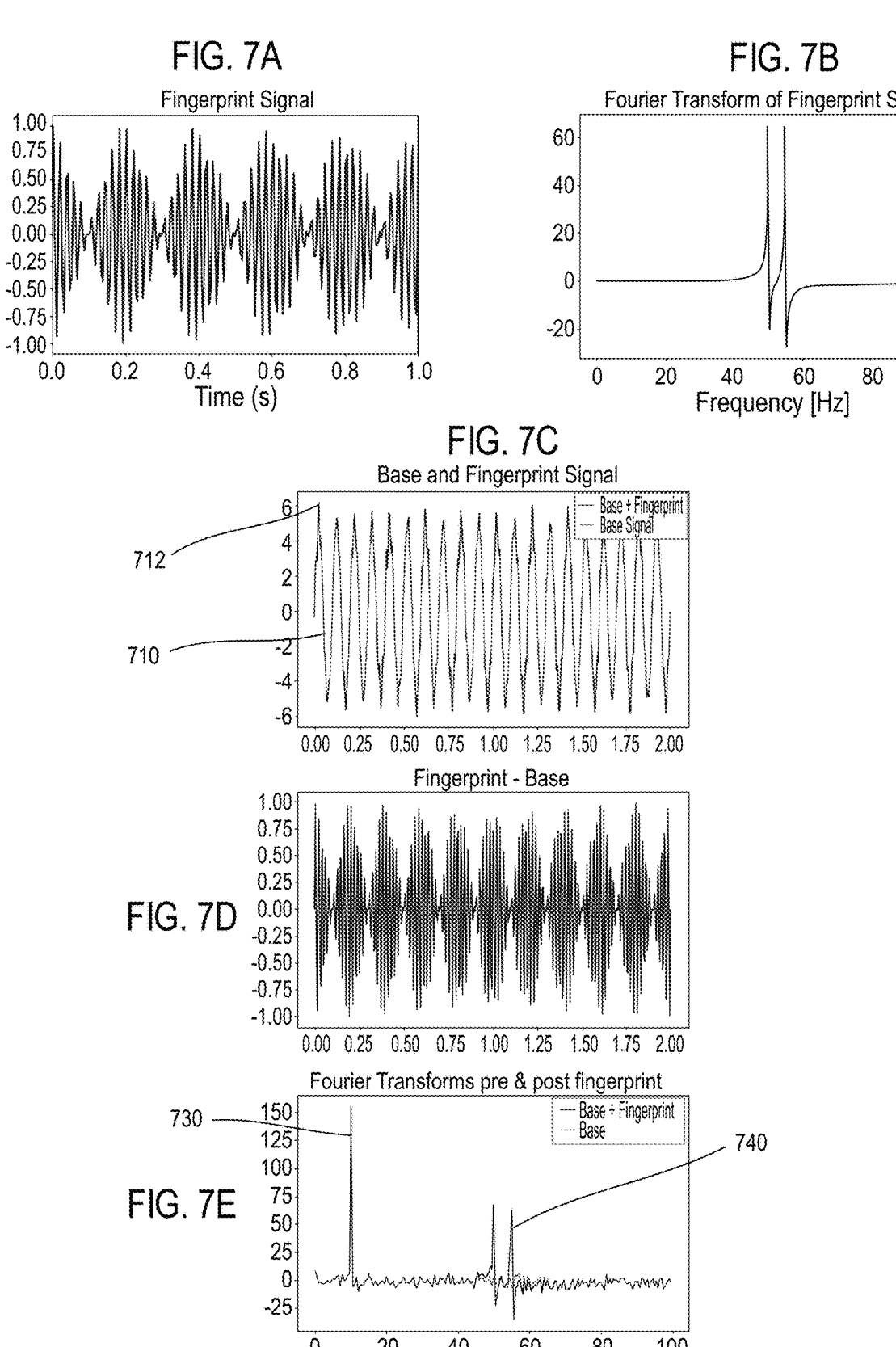
FIG. 7A shows an example multiple frequency fingerprint signals.
FIG. 7B shows a Fourier transformation of the multiple frequency fingerprint signals in FIG. 7A.
FIG. 7C shows the interposition of the base signal in FIG. 4A and the multi-band fingerprint signals in FIG. 7A.
FIG. 7D shows the combined base signal in FIG. 4A and the multi-band fingerprint signals in FIG. 7A.
FIG. 7E is the output of a Fourier transformation of the base signal in FIG. 4A and the multi-band fingerprint signal in FIG. 7A.

In this example, two fingerprint signals at different frequencies are used. FIG. 7A shows a trace of the resulting fingerprint signals. A Fourier transformation is then applied to the fingerprint signals according to the following code.

```
power_finger = np.fft.fft(finger_print).real[:(N//2)]
plt.plot(freq, power_finger);
plt.title('Fourier Transform of Fingerprint Signal');
plt.xlabel('Frequency (Hz)');
```

FIG. 7B shows the resulting signal from the Fourier transformation of the fingerprint signals after executing the above code.

The multi-band fingerprint signal from FIG. 7A is then added to a base signal such as the base signal shown in FIG. 4A. An example code segment for adding the multi-band fingerprint signal to the base signal shown in FIG. 4A is as follows:

```
base_fingerprint = base_sig + finger_print
# Both Signals
plt.figure(figsize= (10, 21))
plt.subplot(3, 1, 1)
plt.title('Base and Fingerprint Signal')
plt.plot(t, base_fingerprint, label='Base + Fingerprint');
plt.plot(t, base_sig, label='Base Signal');
plt.legend( );
# Difference
plt.subplot(3, 1, 2)
plt.title('Fingerprint – Base')
plt.plot(t, base_fingerprint – base_sig);
# FFT of combined signal
power_finger = np.fft.fft(base_fingerprint).real[:(N//2)]
plt.subplot(3, 1, 3)
plt.plot(freq, power_finger, label='Base + Fingerprint');
plt.plot(freq, power, label='Base');
plt.title('Fourier Transforms pre & post fingerprint');
plt.xlabel('Frequency (Hz)');
plt.legend( );
```

FIG. 7C shows the interposition of the base signal and the multi-band fingerprint signal. One trace 710 shows the base signal and a second trace 712 shows the fingerprint signal. FIG. 7D shows the combined base signal and multi-band fingerprint signal. FIG. 7E shows the resulting output of the Fourier transformation of the base and fingerprint signal. A first trace 730 shows the base signal and a second trace 740 shows the base signal and the finger print signal. The transformed signal may then be sent to a receiver of the confidential data.

If the confidential data is leaked, the multi-band fingerprint signal may be extracted by examining the confidential data base signal. First, a filter determines a Butterworth response of the original data. An example code segment to perform this function is shown as follows:

```
# Design the filter
#range_of_filter = (freq_finger2 – freq_finger1)
range_of_filter = 10
band_centre = freq_finger1#np.mean([freq_finger1,
freq_finger2])
bands = [band_centre – range_of_filter, band_centre +
range_of_filter]
filter_bands = [i / (0.5 * sample_freq) for i in bands]
order = 5
sos = signal.butter(order, filter_bands, btype='bandpass',
analog=False,
output='sos')
w, h = signal.sosfreqz(sos, worN=2000)
w = w * 0.5 * sample_freq
plt.plot(w, 20 * np.log10(abs(h)))
#plt.xscale('log')
plt.title('Butterworth filter frequency response')
plt.xlabel('Frequency [Hz]')
plt.ylabel('Amplitude [dB]')
#plt.margins(0, 0.1)
plt.xlim([0, 200])
plt.grid(which='both', axis='both')
plt.axvline(bands[0], color='green') # cutoff frequency
plt.axvline(bands[1], color='green') # cutoff frequency
plt.show( )
y = signal.sosfilt(sos, base_fingerprint)
```

FIG. 8A shows the resulting Butterworth response.

The leaked data is then filtered through the routine. An example of the filter code is as follows:

```
# Design the filter
#range_of_filter = (freq_finger2 – freq_finger1)
range_of_filter = 10
band_centre = freq_finger2#np.mean([freq_finger1,
freq_finger2])
bands = [band_centre – range_of_filter, band_centre +
range_of_filter]
filter_bands = [i / (0.5 * sample_freq) for i in bands]
sos = signal.butter(order, filter_bands, btype='bandpass',
analog=False,
output='sos')
w, h = signal.sosfreqz(sos, worN=2000)
w = w * 0.5 * sample_freq
plt.plot(w, 20 * np.log10(abs(h)))
#plt.xscale('log')
plt.title('Butterworth filter frequency response')
plt.xlabel('Frequency [Hz]')
plt.ylabel('Amplitude [dB]')
#plt.margins(0, 0.1)
plt.xlim([0, 200])
plt.grid(which='both', axis='both')
plt.axvline(bands[0], color='green') # cutoff frequency
plt.axvline(bands[1], color='green') # cutoff frequency
plt.show( )
```

FIG. 8B shows the resulting Butterworth response of the leaked base signal.

The resulting responses are then compared by applying a Fourier transformation to both signals. An example of the comparison is shown in following code:

```
# Both Signals
plt.figure(figsize=(10, 14))
# Apply the filter to the 1st second of the signal
y = signal.sosfilt(sos, y)
delay = ((2 * order – 1)) / (2 *sample_freq)
plt.subplot(2, 1, 1)
plt.plot (t – delay, y / y.max( ), label='Extracted
Fingerprint')
plt.plot (t, finger_print / finger_print.max( ),
label='Original Fingerprint')
plt.xlim([0.2, 1])
plt.legend(loc='upper right')
# FFT of combined signal
power_y = np.fft.fft(y).real[:(N//2)]
plt.subplot (2, 1, 2)
#plt.plot(freq, power_finger, label='Base + Fingerprint');
plt.plot(freq, power_y, label='Extracted Fingerprint');
plt.title('Fourier Transforms pre & post fingerprint');
plt.xlabel('Frequency (Hz)');
plt.legend( );
```

FIG. 8C shows the extracted fingerprints from the original signal and the leaked signal. One trace 810 shows the original fingerprint and another trace 820 shows the extracted finger print. The Butterworth filter introduces a lag into the signal, which is essentially shifting the signal to the right in the time domain by a number of samples. Thus, the trace 820 is shifted from the trace 810. FIG. 8D shows the Fourier transformation of the extracted fingerprint signal. The Fourier transform shows the extracted signal in the frequency domain and shows the peaks at 50 and 55 Hz which were the frequencies used in the fingerprint. In terms of actually comparing the two signals, a simple subtraction with thresholding could be performed, a classifier such as a support vector machine (SVM), dynamic time warping could be used or principle component analysis could be used. Thus, any method for determining a measure of similarity to the original fingerprint could be used for the comparison.

One optional aspect of the system is the analog introduction of data, whereby sensor signals such as pressure, flow, mic, or other electrical items from the sensors 132 have a portion of operational data added at the flow generator level in analog circuitry, prior to analog to digital conversion. Thus, the fingerprint generation engine 230 may be part of the RPT 110, or even an external device that processes the analog sensor signals. In this way, unique characteristics of a particular device and components can be hidden in the sensor signals, in such as a way as that they are not subsequently filtered by digital filterbanks in firmware. The purpose of this analog embedding is to cause small variations or error signals in the subsequently digitated error signals (that might otherwise be removed) in order that it can be later proven that the datasets/records were actually collected by a real device, and not synthetic or simulated data, or collected via a different type of device (such as from a different family of devices or different vendor).

In some cases, the data added at the machine level (e.g., the RPT 110, such as a PAP flow generator, ventilator, etc.) could be added in the digital domain, and crafted so as to be not easily filtered/attenuated/degraded/damaged/removed (i.e., to be in-band with likely desirable signals, but not unduly affecting the signal to noise (SNR) of these desired signals). These digital adaptations could be at the sample/ symbol level, or be context aware, and adapt to the type of signals (e.g., the channel type, or the prevailing morphology of the signals, and expected statistics of the signals). Characteristics of motor noise can be used, relating to the blower motor for example, or to variations in the noise floor of the microphone within the RPT device 110 when on or off therapy, i.e., delivering, or not, respiratory therapy/pressurized air flow. One example of a fully analog example may be breath waveforms being proprietary data of a patient. The breath waveforms may be recorded by a pressure sensor, flow sensor, microphone, or other sensor(s) in or associated with a respiratory device. In this example, the analog circuitry of the RPT device transforms motor noise signal as the identification and adds it to the breath waveform analog signal, the resulting analog signal is digitized, and the identification data may then be sent to the cloud (e.g. a separate digitization of the analog signal). In a fully digital example (or hybrid analog and digital combination) the breath waveform from one or more sensors (e.g., at least one sensor, for a least one period of time) is digitized and the digital breath waveform combines with a digital representation of motor noise (such as representing the wear of the bearings, if present, based on a frequency domain analysis of the motor noise (such as a vibration spectrum), monitoring fluctuations in current and/or voltage consumption with varying rpm). The motor sensors could be the voltage, current over time, and/or temperature changes, and/or vibrations (such as detected via an accelerometer), or vibrations and other motor sounds as detected by a microphone (for example a microphone within the RPT device such as a microphone attached to one of the circuit boards of the RPT device).

The digital data could be synthesized (or downloaded from a cloud, or generated by a neural network) and added by a processor to the analog sensor signals, or an analog signal could separately digitized and mixed with the other desired analog signals that have been sampled.

Furthermore, analog and/or digital adjustments of the signals can be designed to be tolerant of common signal processing operations such as low pass filtering, high pass filtering, bandpass filtering, adaptive filtering, resampling (such as low pass filtering and downsampling) and so forth—by operating on the fiducial points of the signals (such as subtle variations of a breath by breath waveform, and estimated cepstrum from a microphone (acoustic) signal, variations to a cardiogenic oscillation (CGO—heart beat related) signal during an apnea and so forth, rather than merely increasing the noise floor. In other words, this system can work with variable data signals, where higher data rate breath by breath signals are retrained, as well as supporting highly processed signals (whereby only the order of kB's are retained each night/session). Data could also be manipulated in a specific manner in leak, AHI, residual AHI, snore, session timing, pressure changes, respiration rate, sleep stages, sleep metrics, and so forth—such as by introducing multi step protection.

The strength of the trackable data introduced can be adjusted based on the risk level of the underlying data, where lower data rate summary data is lower risk than higher data rate data containing personally identifiable information. Where the risk level is higher, larger perturbations (designed so as not to impact the clinical care of the person) can be introduced to make it easier to secure the data, and harder for adversaries (such as with collusion among multiple parties) to remove the security measures.

Both the analog and digital approaches described above change the data at the device level. They may even be used to encode data such as the device serial number in higher data rate signals such as breath data, to allow tracing back the data to a particular device—even if any associated meta data has been manipulated by an adversary.

In some examples, a one way mathematical function such as hashing may also or alternatively be applied to the data, and recorded in the metadata. In contrast to the analog or digital approaches, this does not actually modify the data in any way, and can either be stored for future reference, or embedded in meta data. If the hash(es) are not provided, ideally there is nothing an adversary could do to modify the fingerprint as it is always created and stored before the data is released. The potential exists that if someone discovered the fingerprint added to the signal using the single or mixed-band options, they could remove the fingerprint from the signal.

In order to provide an additional layer of security, a hash or digest function method may be used where the data is not modified in any way to create a hash value. A unique log of the data is stored and then a later comparison against the hash is made. The hash methodology is more data agnostic in that it works for time series data, images, text, and other data sources. The hash function can be varied based on the target end user, and thus a unique fixed length hash value (which could be for example, 32, 64, 128, 256, 512 bits—or some other length) for the same input data is created for each end user. A constant value (a salt, such as a single use salt, and potentially an additional salt/nonce to increase the entropy) could also be added (and kept secret) prior to carrying out the hashing function.

The hash methodology includes: 1) creating a unique hash function with a salt value (basically a random alphanumeric code) allocated to the data consumer; and 2) as the input data is received, buffer it into a reasonably sized chunks; 3) using the unique hash function, generate a hash for each data chunk and store the hash in a database, perhaps with some indexing that makes it easily retrievable; and pass the data through to the consumer. The size of chunk is dependent on the type of data. The chunk for a single image may be 20 characters or text or 40 bytes, or frames for a digitized sensor signal such as from a PAP sensor. The exact size of each chunk is to be a balance between how much computational effort/storage required to generate and store the hash values as well as the minimum amount of data to identify the source of a leak. In terms of images, a copy of the data may need to be modified before the hash is generated e.g. a 20×20 pixel RGB image is a matrix of numbers between 0 and 255 (20×20×3) and may need to be reshaped into a single vector 1200×1 to create the hash.

One advantage of included a one-way hash function is also that there is some efficiency in that if there are multiple data consumers for the one data set, there isn't much more overhead in computing the hashes for multiple providers at the same time.

To determine who has leaked the data, the sample of leaked data is examined. Starting at the first byte, a chunk of the specified length is passed through the hash functions for the suspected leakers and checked for a match. The "chunk window" may then be moved to starting from the second byte and repeated. The matches and no matches may be observed or the number of matches may be counted. The consumer with the highest matches probably leaked the data.

The hashing approach has the disadvantage in that tiny changes (whether accidentally or deliberately carried out) to the leaked data can produce a different hash, and thus complicate proving that a particular dataset or subset was leaked. It is suggested that a combination of techniques—such as analog or digital data manipulation combined with hashing could be superior.

A simple realization of the digital manipulation is to use an approach such as a single/mixed band frequency fingerprint. An example process for generating the identification would first create a unique fingerprint for each data consumer, e.g., modify the function(s) (sin, cos, tan, cosh . . . ), frequency, amplitude and phase used to generate the unique fingerprint. The amplitude should not be large enough to significantly modify the signal. Second, the fingerprint is added to the datastream as it passes through (through either simple addition or convolutional operation in the case of images).

To extract the signal, an IIR or FIR filter is used to extract the signal from the leaked content and then perform a pattern match to identify the culprit. This method modifies the original datastream, and can require a larger dataset to get a higher probability match. It is better suited for sensor signals, extracted biosignals, or bio stats extracted, than for meta data.

Once data (with or without added security measures) are collected, it may be desired to share all or part of a dataset with a group or a third party. In this case, it is desirable to mark or adjust these data to identify the party they are shared with. Whilst hashing (such as MD5, SHA256 and so forth, signed with a digital signature etc.) could be used to identify the full archive or objects within, it may be desirable to provide more robust and context aware security. Classic watermarking of images is not applicable to the combination of time series sensor signals, partially processed bio signals, processed metrics, and associated or loosely coupled structured and unstructured data. The principles disclosed herein are a context aware method of adapting the salient signal characteristics of the flow generator (or RPT device) sensors, and typically employed processing routines, such that a robust and multi-level process for security can be added to the shared data—such that even a leak of a random subject of these data, with some common signal processing operations employed, can still be traced back to the party that leaked or inadvertently shared the confidential data. The multi-step process can also be used to check if the data are real—i.e., did the data come from a real device, have they been manipulated, or are they synthesized/artificially generated. As noted, it is possible to use the microphone and other sensor noise characteristics (as well as characteristics resonances when in operation) in order to show that the original data was real, and optionally act as a hidden serial number for the source device. Such features/artifacts can be hidden even in compressed/processed data streams.

Prior to sharing with another party, the original data could be stored in an immutable form, with highly restricted access. Any further access/processing (even internally) of these data at rest would actually be to a version that has an extra level of security provided, in order to identify the intended recipient. The data that uniquely identify the authorized user could be held in escrow by a trusted third party such as a notary. The level of protection applied could be commensurate such as to the sensitivity of the data. The identification parameters could be applied to the subtly modified data, such that derived cardiac and/or respiration metrics are now based on known modified parameters. Thus, the features listed below can be different for each end user/recipient of the data (but unmodified in the secret escrow original version). Depending on the intended use case of the shared data, the security processing could subtly adjust certain statistical metrics, and not others. For example, if the intended use was to look at prescribed therapy compliance, the session length and mask on/off time, and/or sleep metrics (such as time in certain types of sleep stages or wakefulness) might be important to retain as close to the original as possible, whereas the respiration rate or heart rate could be adjusted further. For example, identification could be made in terms of specific recipient via distinguishing biometric parameters that are input to a user classifier, which can calculate and combine features from cardiac and respiratory signals for such a purpose. Optionally, if a good quality HR (heart rate) is not available/detected, the system can fallback to BR (breathing rate) for some or all of the processing period under consideration. Thus, a system may rely on different biometric characteristics to identify a person depending on quality of detected biometric characteristics. For example, different features (e.g., two or more) may be evaluated as part of a biometric fingerprint. Such features may include breathing/respiration signal related parameters, cardiac/heart signals, or cardiorespiratory signals. The breathing respiration signal related parameters may include variability of breathing rate throughout the day and/or night (the variability being characteristic of the user); interbreath variability (which could be the varying times between inspirations, varying times between expirations for example) or variability of a derived rate (which might be used to smooth out unusual breaths, such as when rolling over etc.) or over longer timescales—e.g., 30, 60, 90 sec or much longer periods); the stability over time (related to the variability); the standard deviation of breathing rate; the depth of respiration (shallow, deep etc.), and relative amplitude of adjacent breaths; the mean or average value of the breathing rate; the trimmed mean (e.g., at 10%) to reject outliers; wake or asleep (i.e., the sleep state of the user as detected); surges (sudden accelerations or decelerations) in breathing rate seen during quiet periods and during REM sleep; median (50th percentile); interquartile range (25th-75th Percentile); 5th-95th Percentile; 10th-90th Percentile; shape of histogram; skewness; kurtosis; peak frequency over time; ratio of second and third Harmonics of peak frequency; percentage of valid data (valid physiologically plausible data); autocorrelation of the individual signals; characteristic patterns in the spectrogram; or relative percentage of REM and deep sleep. The cardiac/heart signal parameters may include heart rate variability (inter beat (e.g., as derived from the Ballistocardiogram) and over longer defined moving windows—e.g., 30, 60, 90 sec); variability over time (interbeat/breath variability); mean; trimmed mean (10%); standard deviation; median (50th percentile); interquartile range (25th-75th Percentile); 5th-95th Percentile; 10th-90th Percentile; shape of histogram; skewness; kurtosis; stability over time; peak frequency over time; ratio of second and third harmonics of peak frequency; percentage of valid data (valid physiologically plausible data); wake or asleep; autocorrelation of the individual signals; or characteristic patterns in the spectrogram. Cardiorespiratory signal parameters may include: magnitude square cross spectral density (in a moving window); cross coherence; respiratory sinus arrhythmia peak; LF/HF ratio to indicate autonomic nervous system parasympathetic/sympathetic balance; the cross correlation, cross coherence (or cross spectral density) of the heart and breathing signal estimates; the characteristic movement patterns over longer time scales, i.e., the statistical behavior observed in the signals; or patterns of movement during detection of and comparison of these heart and breathing signals (e.g., during sleep, some users may have more restful and some more restless sleep). For the intended use was to explore comorbidities, it might be valid to adjust the breath curve as well as breathing rate for hypertension or atrial fibrillation analysis, but it might be undesirable to adjust the breath morphology for COPD/overlap syndrome analysis, as this could be used for exacerbation prediction—but it might be valid to adjust the microphone signal in order to embed stronger protection.

In some cases, the original data may be irrevocably deleted by design, and only processed versions retained. It is realized that multiple versions may be shared with one or more parties, such as an initial dataset, and an incremental dataset—or some extra data streams depending on the contract in place. Therefore, in some cases the core original data changes such be consistent between data shares to a party, so the parties cannot easily compare like records to determine the security modifications carried out prior to sharing. For example, if there are a set of 1000 records, with 600 shared with one party and another 700 shared with another party, some of the records may overlap. In an additional 2000 records, 600 new records are shared with the first party. Thus, it is desirable that protection employed on the original 600 records is consistent with the 600 of the 1200 shared, so the first party can determine the fingerprints by comparing the original 600 to the new set of 1200 (where the party infers the original 600 records, such as via a date stamp, or some other statistics). Another situation that could happen is that the parties collude to try to work out (and reverse) the protection on their partially overlapping records. In this case, the changes may be different for the same record, so ideally the technique makes it difficult to infer what changes were made.

When a third party has carried out multiple steps of pre-processing/data cleaning, and other processing steps, the checking of a signature may have a probability below 1 when comparing to the reference parameters stored in escrow. Thus, a threshold probability can be set such that the likelihood that a leaked dataset did in fact originate from a particular version shared with a party. Therefore, the system can support variable PII/PHI or de-identified sets, variable resolution, variable data streams, and variable security, customized for the type of data being shared. Therefore, the system can support variable use cases, including variable geographies (e.g., support GDPR in Europe, CCPA in the USA and so forth).

Variations to data could be subtle changes to phase, adding an offset to turning points, changing the shape of specific forms (such as breath shape), adjusting subtle features of a spectral representation (e.g., carrying out a DFT such as an FFT on a moving block, manipulating weights/coefficients in a band, and carrying out an IFFT), or changing the relationships between channels such as adding a delay between channels, adding a non-linear skew to channels, adding dither, transposing certain sequences, subtly speeding up or delaying certain parts of a stream that could persist resampling, but not unduly affect expected future signal processing steps/metrics (i.e., not unduly impact aggregate statistics). It is also possible to hide changes in the harmonics of strong fundamental frequencies, whereby the harmonics are located and adjusted (which could mean moving these in frequency, and or introducing a modulation such as frequency or amplitude on these).

Other approaches could be included when sharing data to third parties, such as randomly sampling the records sharing, such that each shared set contains a subset of the original secured dataset, and thus no two parties individually have the full dataset.

In some cases, this may also include adding synthetic or generated data unique to the receiving party to the shared datasets. One advantage is that a third party will not be able to separate real data from synthetic data. In contrast, if the analog or digital marking is introduced at the device level, it will be clear from a later analysis if such real or generated datasets are later leaked or otherwise inappropriately shared—and that such generated sets were uniquely introduced to a specific third party.

With multi-tiered adjustments, and context away processing, it is very challenging for adversary to determine and reverse the protection on data. The system can modify the data to add the fingerprint at the sensor stream level, the physiological signs level, the personal data level, the health metrics level, and so forth.

In some cases, an identifier such as a name or a number can also be encoded with the data—such as steganography, watermarking, and so forth. This combined with adaption of relevant data as outlined above can made it hard to determine the core changes made by steganalysis. As noted, different sensor streams and signals can be processed. This may include other data such as PII, questionnaire data (responses relating to sleepiness, health, etc.) and other data collected via APIs (e.g., steps, heart rate, breathing rate, blood pressure, blood glucose etc.).

Some approaches to generate new traces and features include by convolutional neural networks (CNNs), recurrent neural networks (RNNs) (with optional long short memories LSTMs or bi-directional LSTMS), generative adversarial networks (GAN) and so forth. These models can be tuned to provide similar distributions to the input data, but be much harder to counteract than simpler adjustments of the source original data.

The flow diagram in FIG. 3 are representative of example machine readable instructions for fingerprint process to protect desired confidential data stored on the data protection server 220 in FIG. 2. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 9:
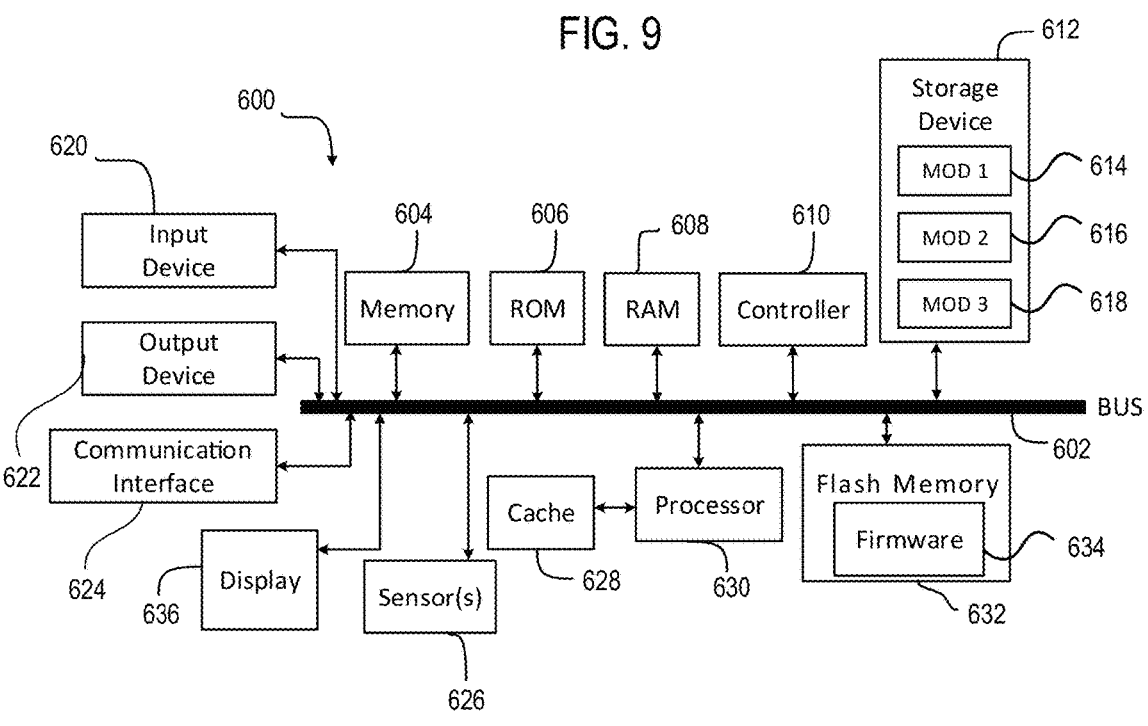
FIGS. 9-10 are block diagram of example computer systems.

FIG. 9 illustrates an example computing system 600, in which the components of the computing system are in electrical communication with each other using a system bus 602. The system 600 includes a processing unit (CPU or processor) 630; and the system bus 602 that couples various system components, including the system memory 604 (e.g., read only memory (ROM) 606 and random access memory (RAM) 608), to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for the processor 630 while waiting for data. These and other modules can control or be configured to control the processor 630 to perform various actions. Other system memory 604 may be available for use as well. The memory 604 can include multiple different types of memory with different performance characteristics. The processor 630 can include any general purpose processor and a hardware module or software module, such as module 1 614, module 2 616, and module 3 618 embedded in the storage device 612. The hardware module or software module is configured to control the processor 630, as well as a special-purpose processor where software instructions are incorporated into the actual processor design. The processor 630 may essentially be a completely self-contained computing system, containing multiple cores or processors, a bus, memory controller, cache, etc. A multi-core processor may be symmetric or asymmetric.

To enable user interaction with the computing system 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the computing system 600. In this example, an output device 622 is also provided. The communications interface 624 can govern and manage the user input and system output.

The storage device 612 can be a non-volatile memory to store data that are accessible by a computer. The storage device 612 can be magnetic cassettes, flash memory cards, solid state memory devices, digital versatile disks, cartridges, random access memories (RAMs) 608, read only memory (ROM) 606, and hybrids thereof.

The controller 610 can be a specialized microcontroller or processor on the system 600, such as a BMC (baseboard management controller). In some cases, the controller 610 can be part of an Intelligent Platform Management Interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event log controller and/or storage for managing and maintaining events, alerts, and notifications received by the controller 610. For example, the controller 610 or a system event log controller can receive alerts or notifications from one or more devices and components, and maintain the alerts or notifications in a system event log storage component.

Flash memory 632 can be an electronic non-volatile computer storage medium or chip that can be used by the system 600 for storage and/or data transfer. The flash memory 632 can be electrically erased and/or reprogrammed. The flash memory 632 can include EPROM (erasable programmable read-only memory), EEPROM (electrically erasable programmable read-only memory), ROM, NVRAM, or CMOS (complementary metal-oxide semiconductor), for example. The flash memory 632 can store a firmware 634 executed by the system 600 when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 634 can recognize, initialize, and test hardware present in the system 600 based on the set of configurations. The firmware 634 can perform a self-test, such as a POST (Power-On-Self-Test), on the system 600. This self-test can test the functionality of various hardware components such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the computing system 600 can include a firmware configuration that defines how the firmware 634 controls various hardware components in the system 600. The firmware configuration can determine the order in which the various hardware components in the system 600 are started. The firmware 634 can provide an interface, such as an UEFI, that allows a variety of different parameters to be set, which can be different from parameters in a firmware default configuration. For example, a user (e.g., an administrator) can use the firmware 634 to specify clock and bus speeds; define what peripherals are attached to the system 600; set monitoring of health (e.g., fan speeds and CPU temperature limits); and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

The computing system 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general purpose output (GPO), and the like. Different types of sensors (e.g., sensors 626) on the system 600 can also report to the controller 610 on parameters, such as cooling fan speeds, power status, operating system (OS) status, hardware status, and so forth. A display 636 may be used by the system 600 to provide graphics related to the applications that are executed by the controller 610.

Figure 10:
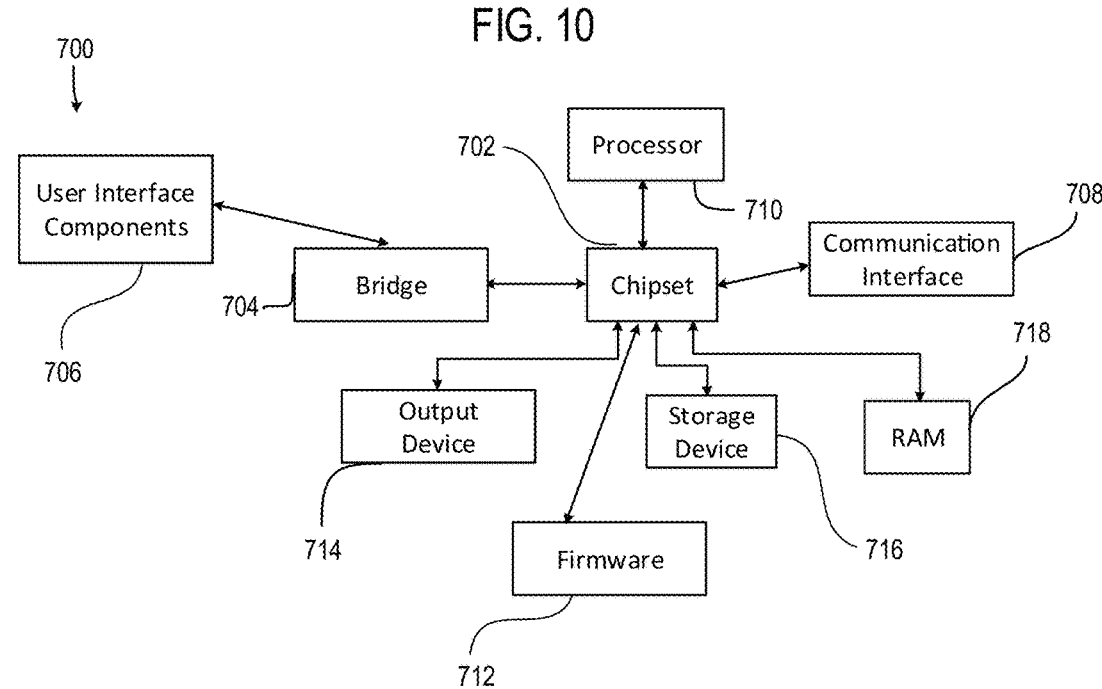

FIG. 10 illustrates an example computer system 700 having a chipset architecture that can be used in executing the described method(s) or operations, and generating and displaying a graphical user interface (GUI). The computer system 700 can include computer hardware, software, and firmware that can be used to implement the disclosed technology. System 700 can include a processor 710, representative of a variety of physically and/or logically distinct resources capable of executing software, firmware, and hardware configured to perform identified computations. The processor 710 can communicate with a chipset 702 that can control input to and output from the processor 710. In this example, chipset 702 outputs information to output device 714, such as a display, and can read and write information to storage device 716. The storage device 716 can include magnetic media, and solid state media, for example. Chipset 702 can also read data from and write data to RAM 718. A bridge 704 for interfacing with a variety of user interface components 706, can be provided for interfacing with chipset 702. User interface components 706 can include a keyboard, a microphone, touch detection and processing circuitry, and a pointing device, such as a mouse.

The chipset 702 can also interface with one or more communication interfaces 708 that can have different physical interfaces. Such communication interfaces can include interfaces for wired and wireless local area networks, for broadband wireless networks, and for personal area networks. Further, the machine can receive inputs from a user via user interface components 706, and execute appropriate functions, such as browsing functions by interpreting these inputs using the processor 710.

Moreover, chipset 702 can also communicate with firmware 712, which can be executed by the computer system 700 when powering on. The firmware 712 can recognize, initialize, and test hardware present in the computer system 700 based on a set of firmware configurations. The firmware 712 can perform a self-test, such as a POST, on the system 700. The self-test can test the functionality of the various hardware components 702-718. The firmware 712 can address and allocate an area in the RAM 718 to store an OS. The firmware 712 can load a boot loader and/or OS, and give control of the system 700 to the OS. In some cases, the firmware 712 can communicate with the hardware components 702-710 and 714-718. Here, the firmware 712 can communicate with the hardware components 702-710 and 714-718 through the chipset 702, and/or through one or more other components. In some cases, the firmware 712 can communicate directly with the hardware components 702-710 and 714-718.

It can be appreciated that example systems 600 (in FIG. 9) and 700 can have more than one processor (e.g., 630, 710), or be part of a group or cluster of computing devices networked together to provide greater processing capability.

The above described technique allows a quick determination of the source of an unauthorized disclosure and if combined with other technologies such as encryption or digital rights management can improve data security. This constitutes an improvement in the data protection technology. The fingerprint simplifies the process of identifying the source of the leak by simply analyzing the leaked data itself and thus allows for the rapid control/containment of the leak.

The technique may be used by any person who desires to allow access to private data but is concerned about unauthorized breaches. The consent management system may broker the transfer of data between providers and receivers and aims to give greater control to the data providers. Any data provider who distributes the data stores/streams to multiple receivers may use the above techniques.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method of identifying a source of data, comprising:
   receiving a request for proprietary data of a first party from a second party;
   generating a set of identification data unique to the second party, wherein the set of identification data is a high frequency fingerprint signal generated as a function of a time stamp of a receiver ID of a transmission signal to the second party;
   operating a treatment device to provide treatment to the first party, wherein the operation of the treatment device generates an analog signal, wherein the analog signal identifies the treatment device;
   adding the analog signal identifying the treatment device to the set of identification data;
   embedding the set of identification data into the proprietary data, wherein the identification data is indistinguishable from the proprietary data; and
   sending the proprietary data with the embedded identification data to the second party via the transmission signal to the second party.

2. The method of claim 1, further comprising:
   determining an unauthorized transfer of the proprietary data to a third party; and
   retrieving the identification data from the propriety data from the third party to determine the source of the proprietary data.

3. The method of claim 1, further comprising:
   maintaining a library of sets of identification data, each of the sets of identification data being unique to a party distinct from the first party, wherein the set of identification data is stored in the library.

4. The method of claim 1, wherein a period of the high frequency signal is proportional to the receiver ID and the phase of the timestamp of transmission.

5. The method of claim 1, wherein the proprietary data is organized in kernels, and wherein the identification data includes convolutional operators with the values of the kernel and size of the kernel specific to the identification data.

6. The method of claim 1, wherein the identification data includes discrete data values, wherein the identification data is embedded at known locations in the proprietary data.

7. The method of claim 1, further comprising converting the proprietary data to a digital format after embedding the set of identification data.

8. The method of claim 1, wherein the proprietary data is a physiological waveform measured from the first party.

9. The method of claim 1, wherein the embedding occurs on the treatment device.

10. The method of claim 9, wherein the treatment device is a respiratory therapy device including a microphone and a motor driving an air pressure generator to provide air flow therapy to the first party, and wherein the analog signal is one of a microphone signal sensing motor noise from the motor or a pressure sensor signal sensing air flow generated by the air pressure generator while the respiratory therapy device provides air flow therapy to the first party.

11. A system to embed identification data to track proprietary data supplied by a first party, the system comprising:

a storage device storing proprietary data belonging to the first party;

a processor that executes computer instructions to:

generate identification data unique to the second party, wherein the set of identification data is a high frequency fingerprint signal generated as a function of a time stamp of a receiver ID of a transmission signal to the second party;

receive device identification data identifying a treatment device providing treatment to the first party, wherein the device identification data includes an analog signal generated by the operation of the treatment device, the analog signal identifying the treatment device;

add the device identification data identifying the respiratory therapy device to the identification data;

embed the identification data to the proprietary data, wherein the identification data is indistinguishable from the proprietary data; and send the combined proprietary and identification data in the transmission signal to the second party via a data transmitter.

12. The system of claim 11, wherein the processor further executes computer instructions to retrieve the identification data from the propriety data from the third party to determine the source of the proprietary data when an unauthorized transfer of the proprietary data to a third party occurs.

13. The system of claim 11, further comprising a library of sets of identification data, each of the sets of identification data being unique to a party distinct from the first party, wherein the set of identification data is stored in the library.

14. The system of claim 11, further comprising an analog to digital converter operable to convert the proprietary data to a digital format after embedding the set of identification data.

15. The system of claim 11, wherein the fingerprint engine is part of the treatment device.

16. The system of claim 11, wherein the treatment device includes a sensor monitoring an operational function of the treatment device when the treatment device provides treatment to the first party.

17. The system of claim 16, wherein the treatment device is a respiratory therapy device including a microphone and a motor driving an air pressure generator to provide air flow therapy to the first party, and the sensor is one of the microphone sensing motor noise from the motor or a pressure sensor sensing air flow generated by the air pressure generator while of the respiratory therapy device provides air flow therapy to the first party.

18. The system of claim 11, wherein the proprietary data is breath related data from breathing sensed from the first party.

19. A non-transitory computer program product comprising instructions which, when executed by a computer, cause the computer to carry out:

receiving a request for proprietary data of a first party from a second party;

generating a set of identification data unique to the second party, wherein the set of identification data is a high frequency fingerprint signal generated as a function of a time stamp of a receiver ID of a transmission signal to the second party;

receiving device identification data identifying a treatment device providing treatment to the first party, wherein the operation of the treatment device generates an analog signal identifying the treatment device;

adding the device identification data identifying the respiratory therapy device to the identification data;

embedding the set of identification data into the proprietary data, wherein the identification data is indistinguishable from the proprietary data; and sending the proprietary data with the embedded identification data to the second party via the transmission signal.

* * * * *